United States Patent [19]

Sekmakas et al.

[11] 4,085,161

[45] Apr. 18, 1978

[54] ELECTRODEPOSITION OF AQUEOUS DISPERSIONS OF COPOLYMERS OF POLYETHYLENICALLY UNSATURATED EPOXY ADDUCTS INCLUDING BLOCKED ISOCYANATE MONOMER

[75] Inventors: Kazys Sekmakas, Chicago; Raj Shah, Schaumburg, both of Ill.

[73] Assignee: DeSoto, Inc., Des Plaines, Ill.

[21] Appl. No.: 737,729

[22] Filed: Nov. 1, 1976

[51] Int. Cl.$^2$ .............................................. C08L 63/00
[52] U.S. Cl. ...................... 260/837 R; 260/29.6 HN; 260/29.6 TA; 260/77.5 R; 260/77.5 AM; 260/77.5 AP; 260/77.5 CR; 260/836; 526/320
[58] Field of Search .............. 260/836, 837 R, 77.5 R, 260/77.5 CR, 77.5 AM, 77.5 AP

[56] References Cited

U.S. PATENT DOCUMENTS

| | | | |
|---|---|---|---|
| 2,826,562 | 3/1958 | Shokal | 260/837 R |
| 3,367,992 | 2/1968 | Bearden | 260/837 R |
| 3,373,221 | 3/1968 | May | 260/837 R |
| 3,670,047 | 6/1972 | Broecker | 260/837 R |
| 3,883,483 | 5/1975 | Anderson | 260/77.5 TB |
| 3,976,615 | 8/1976 | Sekmakas | 260/837 R |

FOREIGN PATENT DOCUMENTS 763,347  12/1956  United Kingdom ............ 260/830 P

*Primary Examiner*—Paul Lieberman
*Attorney, Agent, or Firm*—Dressler, Goldsmith, Clement, Gordon & Shore, Ltd.

[57] ABSTRACT

Nongelled, amine-functional copolymers dispersible in water with the aid of a solubilizing acid are provided by copolymerizing: (A) an ethylenically unsaturated hydroxy-functional adduct of a diepoxide having from about 1.2 to about 2.0 epoxy groups per molecule, said epoxy groups being replaced by ethylenically unsaturated groups; (B) copolymerizable monoethylenically unsaturated monomers including amine-functional monomer; and (C) a blocked ethylenically unsaturated isocyanate which preferably includes a plurality of alcohol-blocked isocyanate groups. The amine-functional polymers can be dispersed in water at a pH close to neutral, and they are particularly useful to enable corrosion-resistant coatings to be electrodeposited at the cathode and cured at a lower than usual baking temperature.

12 Claims, No Drawings

ELECTRODEPOSITION OF AQUEOUS DISPERSIONS OF COPOLYMERS OF POLYETHYLENICALLY UNSATURATED EPOXY ADDUCTS INCLUDING BLOCKED ISOCYANATE MONOMER

This invention relates to the cationic electrodeposition of aqueous dispersions of polyamine copolymers which will cure at a lowered curing temperature.

The cationic electrodeposition of polyamine polymers from aqueous dispersion is known, but these tend to require excessively high baking temperature.

It is also known, as disclosed in U.S. Pat. No. 3,883,483, to copolymerize monoethylenically unsaturated monomers, including an amine-functional monomer, with the reaction product of a half-blocked diisocyanate and an ethylenically unsaturated hydroxyl-containing monomer. The resulting polyamine copolymer is dispersed in water with an acid, electrodeposited at the cathode, and cured by baking.

As a result of the emphasis in U.S. Pat. No. 3,883,483 on the use of monoethylenic reactants, these being the only monomers specified among the many mentioned, the cationic copolymer deposited in the prior art is a linear copolymer and an excessive proportion of expensive blocked monoethylenically unsaturated isocyanate monomer is required to cure it.

A feature of this invention is to include in the copolymer a proportion of epoxy resin-based polyethylenically unsaturated component which provides a branched copolymer having an aromatic polyether base so that less blocked monoethylenically unsaturated isocyanate monomer is needed to provide a superior cure.

Another problem in the prior art is the use of derivatives of organic diisocyanates. Unless complex derivatives are formed, half of the initially available isocyanate functionality is consumed by the introduction of the ethylenic unsaturation, and it is desired to minimize this loss while increasing the functionality of the isocyanate monomer.

In accordance with this invention, nongelled, amine-functional copolymers dispersible in water with the aid of a solubilizing acid are provided by copolymerizing: (A) an ethylenically unsaturated hydroxy-functional adduct of a diepoxide having from about 1.2 to about 2.0 epoxy groups per molecule, said epoxy groups being replaced by ethylenically unsaturated groups; (B) copolymerizable monoethylenically unsaturated monomers including amine-functional monomer; and (C) a blocked ethylenically unsaturated isocyanate which preferably includes a plurality of alcohol-blocked isocyanate groups. The amine-functional polymers can be dispersed in water at a pH close to neutral, and they are particularly useful to enable corrosion-resistant coatings to be electrodeposited at the cathode and cured at a lower than usual baking temperature.

The copolymers of this invention are stably dispersible in water at a pH in excess of about 5.0, preferably at least 6.0, up to about 7.5, and they can be electrodeposited from the aqueous dispersion at the cathode and cured to provide cured coatings having many desirable properties. The high corrosion resistance is particularly outstanding (salt spray and detergent resistance), and the high gloss and hardness combined with reasonable flexibility are also impressive. Moreover, the usual curing temperatures needed for amine polymers deposited at the cathode together with aminoplast curing agents is in the range of 425° F. to 475° F., whereas the copolymers of this invention cure at temperatures in the range of 350° F. to 425° F., more usually 375° F. to 400° F.

Referring more particularly to the organic diepoxide which is used as the starting material, these desirably have an average molecular weight of at least about 350 and are based on aromatic compounds carrying two OH groups. Since commercial epoxy resins are sometimes mixtures of diepoxides and monoepoxides, these mixtures can be used so long as the epoxy functionality of the mixture is at least about 1.2, preferably at least 1.4 and up to about 2.0. Higher epoxy functionality leads to gelation unless the excess epoxy groups above 2.0 per molecule are consumed by reaction with some saturated component, such as a saturated monocarbocylic acid, such as butyric acid. Unreacted epoxy groups are detrimental in the mixture which is copolymerized and should be avoided.

The diepoxides which are preferred are hydroxy-functional resinous materials having a linear aromatic backbone and an average molecular weight in the range of from about 500 to about 6,000, preferably 700 to about 4,000. These diepoxides normally include a significant hydroxy value (equivalents per 100 grams) of from about 0.2 to about 0.4 which participates in the final cure along with the further hydroxy groups generated by the introduction of the ethylenically unsaturated groups discussed hereinafter. These polyepoxides are more preferably diglycidyl ethers of bisphenols, such as bisphenol A, and have a 1,2-epoxy equivalency of 1.4 to 2.0. The term "bisphenol" denotes a pair of phenolic groups linked together through an intervening alkylene group.

From the standpoint of the commercially available materials, the Shell product Epon 1001 is preferred, this material having an average molecular weight of 1,000, a melting point of 67°-74° C., an epoxy value of 0.20 equivalent per 100 grams (epoxide equivalent weight = 500), and an hydroxyl value of 0.32 equivalent per 100 grams. Other commercial epoxy resins of known composition which are also appropriate for use herein are Epon 834, Epon 864, Epon 1004, and Epon 1007.

The copolymerizable ethylenically unsaturated material which is reacted with the epoxy group to introduce copolymerizable unsaturation is subject to side variation and has the formula R-X in which R is an organic radical including copolymerizable ethylenic unsaturation and X is a substituent carrying at least one active hydrogen atom reactive with the epoxy group, preferably hydroxy or primary amine. The result can be viewed as a derivative of a diepoxide having the formula:

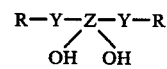

in which R is a copolymerizable ethylenically unsaturated organic radical, Y is the residue of a substituent carrying at least one active hydrogen atom with the active hydrogen atom removed, and Z has the structure of a diepoxide in which the epoxy groups are replaced by the OH groups shown in the formula.

It is stressed that the R group may be any copolymerizable ethylenically unsaturated hydrocarbon, including both monoethylenically unsaturated compounds and polyethylenically unsaturated compounds. The former are particularly available when the substituent is hydroxy, as in hydroxy ethyl acrylate, but the latter are preferred to minimize homopolymerization, as illustrated by oleyl alcohol. The polyethylenic amines are also commercially available when the substituent is primary amine, such as the amine counterparts of the drying and semi-drying fatty acids, such as soya fatty acid. The amine counterparts of oleic acid, linoleic acid and linolenic acid will illustrate the useful polyethylenic materials. Allyl carbamate and allyl amine will illustrate the monoethylenic amines which are useful. The primary amine based on soya fatty acid is particularly preferred, being available in commerce with an amine value slightly in excess of 205, and containing about 98% primary amine. The unsaturation provided by the soya base provides an iodine value slightly in excess of 90. The commercial products Kemamine P-997 and Kemamine P-997D are particularly preferred (products of Humko Sheffield Chemical Co.).

The ethylenically unsaturated alcohols which can be used and the etherification of the starting polyepoxide therewith are more fully described in U.S. Pat. No. 3,976,615 dated Aug. 24, 1976, the disclosure of which is incorporated herein by reference. It is stressed that this invention is not limited to any particular method of making the desired epoxy ethers.

The reaction between the primary amine and the epoxy group is itself conventional, the reactants being simply cooked together at moderate temperature (60°-175° C.). An organic solvent may be present to facilitate reaction, especially inert watermiscible solvents, such as methyl ethyl ketone. The ethylenic unsaturation is retained in this reaction to provide one unsaturated side chain for each epoxy group present in the original diepoxide. The desired reaction is more fully described in our copending application Ser. No. 576,714, filed May 12, 1975 now U.S. Pat. No. 4,033,917, the disclosure of which is also incorporated herein by reference.

By using at least approximately one molar proportion of unsaturated material for each equivalent of epoxy, all of the epoxy functionality can be consumed with minimum increase in molecular weight. If excess unsaturated material is needed to consume the epoxy groups, the unreacted excess can be removed or allowed to remain, as desired.

While excess unsaturated alcohol or unsaturated amine may be present, it represents an unnecessary expense since these simply remain unreacted to be consumed in the subsequent copolymerization. The alcohol or amine may be replaced with a corresponding ethylenically unsaturated acid which can be reacted into the diepoxide by esterification, but this represents a less preferred form of the invention. Methacrylic acid will illustrate an appropriate acid for this purpose.

The reaction of the diepoxide with the unsaturated material produces a polyunsaturated hydroxy functional resinous material which is then copolymerized, preferably in organic solvent solution, with monoethylenically unsaturated monomers, including a proportion of amine-functional monomer to produce an amine copolymer solution. The preferred solution copolymerization is itself conventional, the organic solvent being selected to be water miscible to ease the subsequent solubilization in water with the aid of an acid. Any water-miscible organic solvent may be utilized, such as methyl ethyl ketone, or 2-ethoxy ethanol, and the like.

Since there is more than one ethylenically unsaturated terminal group, this means that the original polyepoxide is now subject to polymer growth at more than one location. In preferred practice, we start with a diepoxide, and copolymer formation occurs at both ends of the molecule, and it is this aspect of the situation which enables a good cure to be obtained with a minimum proportion of blocked isocyanate monomer.

The polyunsaturated hydroxy functional product should constitute from 5-75% of the copolymer, preferably from 20-60%. The balance of the copolymer should consist essentially of copolymerizable monoethylenically unsaturated monomers, a portion of which is amine-functional to enhance the desired water solubility with the aid of a solubilizing acid. From 2-30%, preferably from 5-20%, based on the weight of the copolymer, of monoethylenically unsaturated amine should be used. The amine may be primary, secondary, or tertiary, and, while monoamines are primarily contemplated, polyamines, and even hydroxy functional amines, are considered to be useful. Tertiary monoamines are particularly preferred to provide greatest solubility in water at highest pH.

The ethylenically unsaturated blocked isocyanate monomers may be used in an amount of 2% to 50% of the copolymer, preferably from 10% to 40%. These monomers should contain a single ethylenically unsaturated group and may be constituted by organic diisocyanates which have been reacted with a volatile alcohol to block one of the two isocyanate groups and thus leave a single isocyanate group for reaction with an unsaturated organic compound which is preferably a monoethylenically unsaturated alcohol. A typical diisocyanate is tolylene diisocyanate, a typical blocking alcohol is isooctanol, and a typical unsaturated alcohol is hydroxy ethyl acrylate. All of the foregoing is more fully described in said U.S. Pat. No. 3,883,483 referred to hereinbefore and the disclosure of which is hereby incorporated by reference.

While these known diisocyanate derivatives may be used, they generate difficulty and possess significant limitations. First, it is difficult to obtain blocked diisocyanates with only a single ethylenically unsaturated group, and the presence of two unsaturated groups on a single molecule leads to the formation of undesirable gelled copolymer particles. Second, each half-blocked diisocyanate molecule introduces only a single isocyanate group for cure, and this means that a large number of such molecules are needed to provide a good cure.

In this invention we preferably employ an aromatic compound containing a plurality of aromatic isocyanate groups and only a single aliphatic isocyanate group. The aliphatic isocyanate group is far more reactive, so when equimolar proportions are reacted, only a single ethylenically unsaturated group is formed on each molecule of aromatic polyisocyanate.

The preferred aromatic polyisocyanate has the formula:

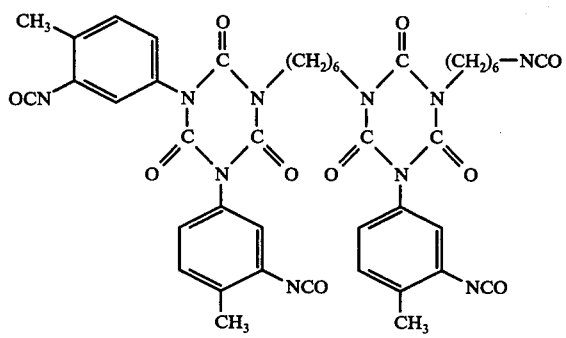

POLYISOCYANATE "A"

As already indicated, the balance of the copolymer consists essentially of monoethylenic monomers. Considering first monomes which are not amine-functional, these may be reactive or nonreactive. Any nonreactive monoethylenic monomer such as styrene, vinyl toluene, methyl methacrylate, ethyl acrylate, dibutyl maleate, acrylonitrile, and the like is appropriate. The larger the proportion of hydroxy-functional polyethylenically unsaturated amine, the less nonreactive monoethylenic monomer will be used.

The monoethylenically unsaturated monomers used to form the amine copolymer may include other water soluble reactive monomers, such as acrylamide, N-methylol acrylamide, or hydroxy ethyl acrylate to increase functional reactivity, but this is not essential.

The class of monoethylenic unsaturated amines is itself well known, this invention being illustrated by the commercially available material dimethyl aminopropyl methacrylamide. However, dimethyl aminoethyl methacrylate, monomethyl aminoethyl methacrylate, aminoethyl methacrylate, and the corresponding acrylates, crotonates, and the like are all fully useful herein. Other amine-functional monomers are illustrated by aminoethyl methacrylate, and t-butyl aminoethyl methacrylate. The tertiary amines are particularly preferred.

Monoethylenically unsaturated tertiary amino amides are quite useful in this invention, and these have the formula:

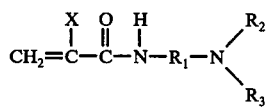

where X is hydrogen or methyl, $R_1$ is $C_1 - C_4$ alkylene, and $R_2$ and $R_3$ are $C_1 - C_4$ alkyl, preferably both methyl.

These unsaturated amino amides are illustrated by dimethylaminopropyl methacrylamide which has the formula:

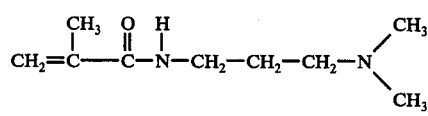

The corresponding acrylate is considered to be equivalent. While the dimethyl amino species is preferred, the coresponding diethyl, dipropyl, or dibutyl amino compounds are also useful.

Up to about 30% of the copolymer may be constituted by the above unsaturated amines or amino amides, preferably from 5-15%.

The preferred solution copolymerization is carried out in conventional fashion, the monomers being preferably dissolved in organic solvent and heat being employed together with a conventional free radical generating catalyst to cause addition polymerization and the production of a solvent-soluble copolymer.

The copolymers which are dispersed in the electrocoating bath are desirably obtained and employed in the form of a solution in water miscible organic solvent, the solvent being desirably present in an amount of at least 10% by weight, based on the weight of the copolymers which are dispersed in the water phase. These water-miscible solvents are preferably present in an amount not in excess of 150%, based on the weight of the dispersed copolymers. The solvent is most desirably present in an amount of from 30-125%, on the same basis. The class of water miscible organic solvents useful herein is well known and has been illustrated previously.

From the standpoint of water solutions, it will be appreciated that the copolymers are dispersed in water with the aid of an acid which solubilizes the resin, the specific nature of the solubilizing acid being of secondary significance since these are well known. It is preferred to employ organic acids such as formic acid, acetic acid, lactic acid, glycollic acid, carbonic acid, or 2-pyridine carboxylic acid, and these may be used alone or in admixture. The preferred solubilizing acids can be characterized as saturated monocarboxylic acids having a dissociation constant in the range of from about 3.0 to about 5.6.

In the preferred practice of this invention, the final water solution should have a pH in the range of 5-7.5, more preferably pH 6-7. When corrosion resistant equipment is available, lower pH can be tolerated.

Neutralization with acid in this invention is usually 50% to 100% of the amine groups.

The aqueous electrocoating bath is normally formulated to have a resin solids content in the range of 2-20%, preferably 5-15%, and the electrodeposited films are baked to cure the same, appropriate baking temperatures having been described hereinbefore. Appropriate baking times will range from about 5 minutes to one hour at the aforesaid baking temperatures.

Throughout this application, and in the examples and claims which follow, all parts are be weight unless otherwise specified.

EXAMPLE 1

Preparation of unsaturated polyurethane intermediate

Parts by weight

|   |   |   |
|---|---|---|
| 1 | 116 | Hydroxy ethyl acrylate (1 OH equivalent) |
|   | 120 | Methyl Ethyl Ketone |
| 2 | 1430 | Polyisocyanate "A" (60% solids in xylene) (4 Equivalent NCO - only one of which is aliphatic). |
| 3 | 400 | Isooctanol (3 equivalents) |
|   | 0.4 | Dibutyl Tin Dilaurate catalyst |

Heat (1) to 60° C.. Add (2) over 1 hour. Add (3) over 1 hour. Hold 2 hours at 60° C. Set vacuum and remove solvent (mostly xylene). Add butyl Cellosolve. in an amount of 340 parts Final characteristics Solids: 58.7%
Viscosity (Gardner) U
Color (Gardner-Holt): 1–2

EXAMPLE 2

Epoxy Ether Intermediate

Parts by weight
1,500: Diglycidyl ether of bisphenol A having an epoxide equivalent weight of 500 (3 equivalents)
900: Unsaturated fatty alcohol (oleyl alcohol having an iodine value of 80) [3 equivalents of hydroxy]
1.2: Boron trifluoride etherate (catalyst)
500: Methyl ethyl ketone The above are mixed together and reacted at 90° C. for 3 hours. The temperature is then increased to 140° C. to distill off the methyl ethyl ketone and 600 parts of butyl Cellosolve is added to provide a solution having the following characteristics:

Final Characteristics

Solids: 80.5%
Viscosity (Gardner): $Z_5$
Color (Gardner-Holdt): 2–3

EXAMPLE 3

Preparation of single component cationic amino-urethane copolymer containing blocked isocyanate groups Parts by weight
410: Epoxy ether intermediate of Example 2
150: 2-butoxy ethanol The above are charged to a reactor equipped with a reflux condensor and heated to 120° C. with agitation.
320: Styrene
120: Dimethyl amino propyl methacrylamide
100: 2-butoxy ethanol
470: Unsaturated intermediate of Example 1
17: Cumene hydroperoxide
12: Tertiary dodecyl mercaptan
6: Di-tertiary butyl peroxide The above monomers and catalyst are added to the reactor over 3 hours at 120° C. and then the mixture is held at this temperature for 1 hour.
6: Cumene hydroperoxide
6: Cumene hydroperoxide The cumene hydroperoxide is added in two portions with the mixture being held for 1 hour at 120° C. each time. The mixture is cooled and 100 parts of 2-butoxy ethanol are added to provide the following final characteristics.
Solids: 59.4%
Viscosity (Gardner) $Z_5$ The previously described amine copolymer solution is employed as follows.

Pigment Dispersion

Grams
200: Solution of this Example 3
700: Titanium dioxide, rutile
100: 2-ethoxy ethanol The above are mixed together to provide pigment dispersion "A".
Grams
26.6: pigment dispersion "A"
112.5: polymer solution of this Example
3.6: Acetic acid
0.035: Dibutyl tin dilaurate (catalyst)
800.: Deionized water The above provides a pH of 5.95 (90% neutralization).

Polymer films were electrodeposited at the cathode as follows:
70 volts — 0.45 mil film thickness
90 volts — 0.51 mil film thickness
110 volts — 0.56 mil film thickness The above films were baked for 20 minutes at 350° F. and 400° F..
At 350° F. bake:
 detergent resistance — 72 hours
 film hardness: 2H-3H
 flexibility: Excellent
At 400° F. bake:
 detergent resistance: 120 hours
 film hardness: 3H
 flexibility: Excellent

EXAMPLE 4

Preparation of unsaturated epoxy-amine adduct intermediate

Parts By Weight
420: Soya fatty amine; Iodine value=90 (2 equivalents of amine) (Kemamine P-997-D-Humko Corp. may be used)
180: Methyl ethyl ketone Change the above to a reactor and heat to 90° C.
1800: Diglycidyl ether of bisphenol A having an average molecular weight of 1800 and an epoxide equivalent weight of 900 (2 equivalents)
775: Methyl ethyl ketone Dissolve the diglycidyl ether of bisphenol A in the methyl ethyl ketone and add the resulting solution to the solution of soya fatty amine over 2 hours while maintaining the temperature at 90° C. The product is then heated to 120° C. and the methyl ethyl ketone is distilled off. Hold for 2 hours at 120° C. and then add 788 parts of 2-butoxy ethanol to provide the following product.

Final Characteristics

Solids: 71.3%
Viscosity (Gardner): $Z_6 - Z_7$
Color (Gardner-Holdt): 3–4

EXAMPLE 5

Preparation of unsaturated amine-epoxide copolymer with unsaturated methane

Parts By Weight
233: unsaturated epoxy-amine intermediate of Example 4.
240: 2-butoxy ethanol The unsaturated epoxy-amine intermediate and the 2-butoxy ethanol are placed in a reactor and heated to 120° C.
158: styrene
45: Hydroxy ethyl acrylate
38: ethyl acrylate
12: cumene hydro peroxide
5: di-tert-butyl peroxide
3: tertiary dodecyl mercaptan
103: dimethyl amino propyl methacrylamide 290: unsaturated polyurethane intermediate of Example 1.

Premix monomers and catalysts and add the mixture to the reactor over 3 hours at 120° C. and hold for 1 hour.

4: cumene-hydro-peroxide

Add and hold at 120° C. for 1 hour.

4: cumene-hydro-peroxide

Add and hold at 120° C. for 2 hours. Cool to 80° C. to provide a copolymer solution.

Final Characteristics

Solids: 61.9%
Viscosity (Gardner): $Z_6 - Z_7$
Color (Gardner-Holdt): 4–5

The above solution is useful in electrocoating in the same way described in Example 3.

We claim:

1. Nongelled, amine-functional copolymers dispersible in water with the aid of a solubilizing acid constituted by a copolymer of (A) 5% – 75% of an ethylenically unsaturated hydroxy-functional adduct of a diepoxide having the formula

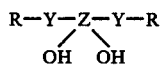

in which R is a copolymerizable ethylenically unsaturated organic radical, Y is the residue of a substituent selected from hydroxy and primary amine, and Z has the structure of a diepoxide having an average molecular weight of at least about 350 and in which the epoxy groups are replaced by the OH groups shown in the formula; (B) copolymerizable monoethylenically unsaturated monomers including 2% – 30% of tertiary amine-functional monomer; and (C) 2% – 50% of a blocked monoethylenically unsaturated derivative of a polyisocyanate in which all of the isocyanate groups are blocked except for one which carries the single unsaturated group, said proportions being based on the weight of the copolymer.

2. Amine-functional copolymers as recited in claim 1 in which said amine-functional monomer is a tertiary amine.

3. Amine-functional copolymers as recited in claim 1 in which said blocked ethylenically unsaturated polyisocyanate is blocked with a volatile alcohol.

4. Amine-functional copolymers as recited in claim 1 in which said diepoxide is a diglycidyl ether of a bisphenol having an average molecular weight in the range of about 500 to about 6000.

5. Amine-functional copolymers as recited in claim 4 in which said diglycidyl ether of a bisphenol is reacted with soya fatty amine.

6. Amine-functional copolymers as recited in claim 4 in which said diglycidyl ether of a bisphenol is reacted with oleyl alcohol.

7. Amine-functional copolymers as recited in claim 1 in which said blocked polyisocyanate is an alcohol-blocked reaction product of one mol of a copolymerizable ethylenically unsaturated alcohol with one mol of an organic polyisocyanate containing a plurality of aromatic isocyanate groups and a single aliphatic isocyanate group, all of the remaining isocyanate groups in said reaction product being blocked with a volatile alcohol.

8. Amine-functional copolymers as recited in claim 7 in which said blocked isocyanate has the formula:

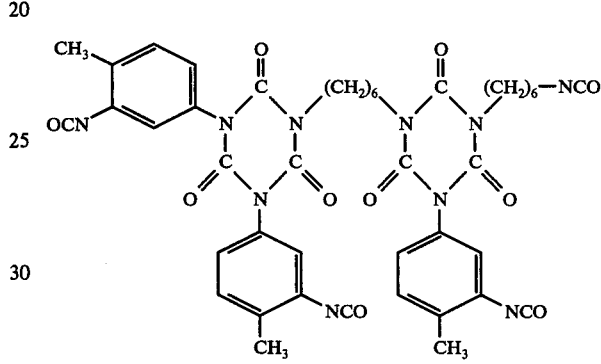

9. Amine-functional copolymers as recited in claim 1 in which said monoethylenically unsaturated tertiary amine is an amino amide.

10. A stable aqueous dispersion of the amine functional copolymers defined in claim 1 dispersed with the aid of water-miscible organic solvent and a solubilizing acid, said dispersion having a pH in the range of pH 5.0 – 7.5.

11. A stable aqueous dispersion as recited in claim 10 in which said solvent is present in an amount of from 30% – 125% of the weight of the copolymers and said dispersion has a resin solids content of from 2 – 20% by weight.

12. Amine-functional copolymers as recited in claim 11 in which said dispersion has a pH in the range of pH 6.0 – 7.0.

* * * * *